Oct. 27, 1953   J. R. GRANT   2,656,945
EGG TRAY AND COVER
Filed Jan. 6, 1949   4 Sheets-Sheet 1

INVENTOR.
Jesse R. Grant,
BY
George H. Simmons
ATTY

Oct. 27, 1953 — J. R. GRANT — 2,656,945
EGG TRAY AND COVER
Filed Jan. 6, 1949 — 4 Sheets-Sheet 2

INVENTOR.
Jesse R. Grant,
BY
George H. Simmons

Oct. 27, 1953  J. R. GRANT  2,656,945
EGG TRAY AND COVER
Filed Jan. 6, 1949  4 Sheets-Sheet 3
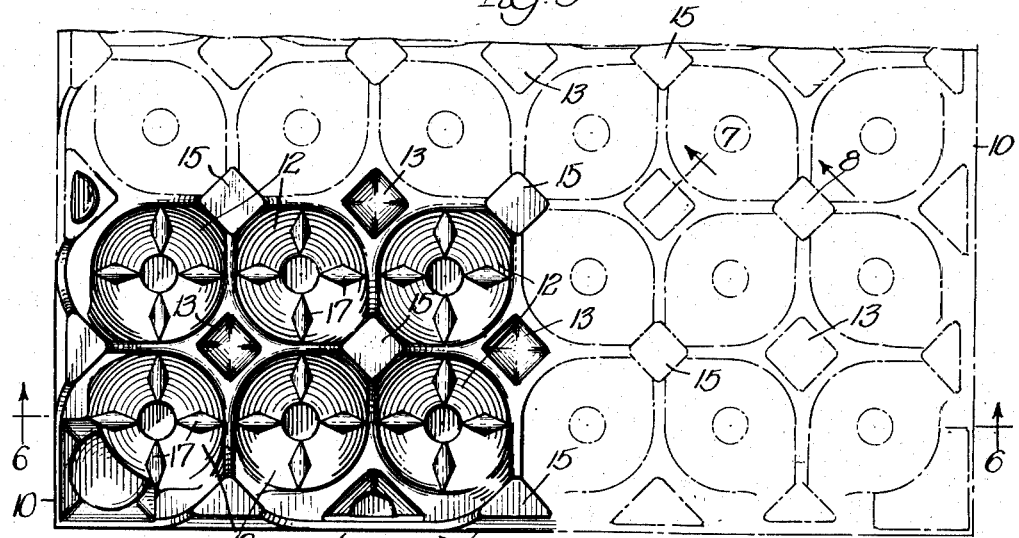
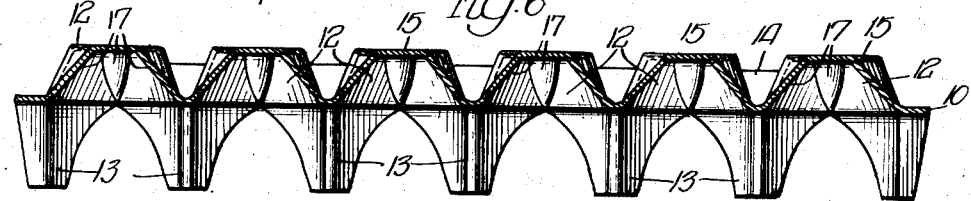
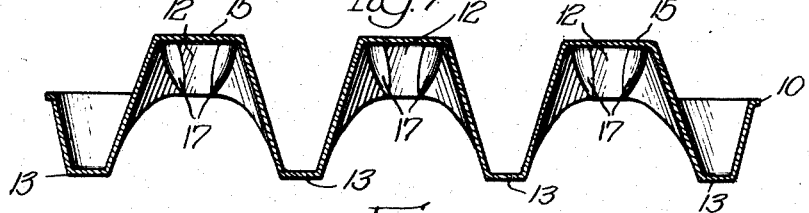
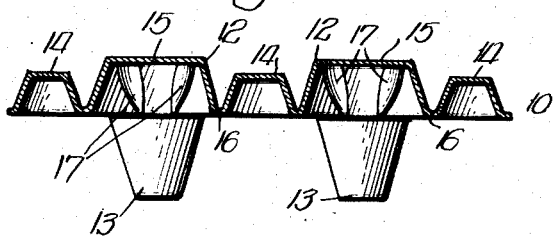
INVENTOR.
Jesse R. Grant,
BY
George H. Simmons
atty.

Oct. 27, 1953　　　　　　　J. R. GRANT　　　　　　　2,656,945
EGG TRAY AND COVER
Filed Jan. 6, 1949　　　　　　　　　　　　　　　　　4 Sheets-Sheet 4
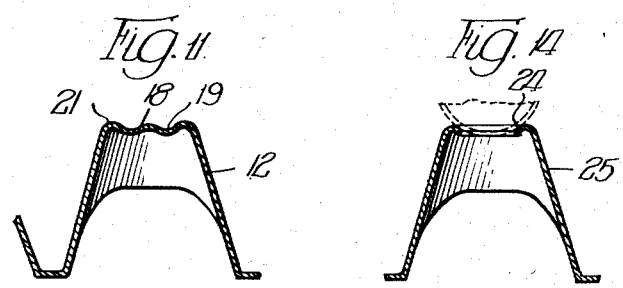
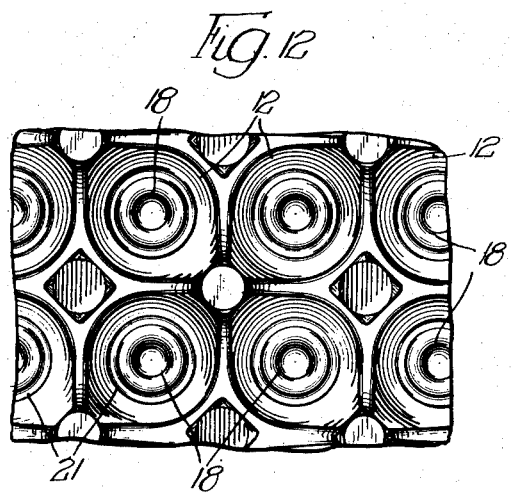
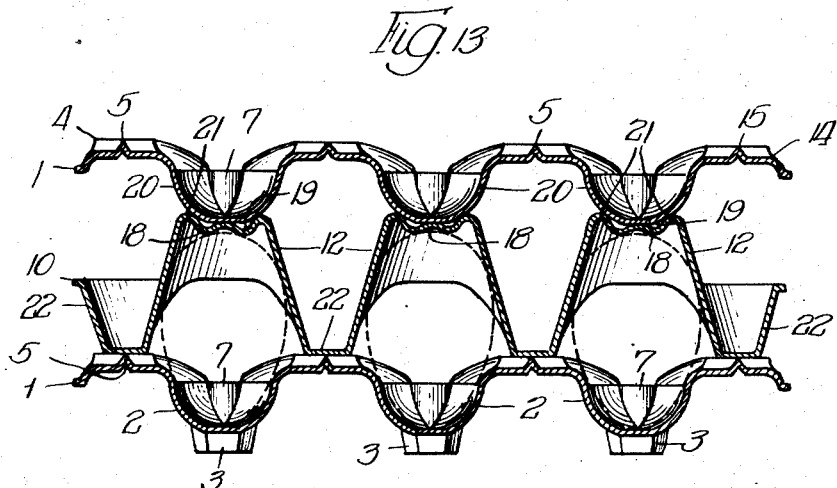
INVENTOR.
Jesse R. Grant,
BY
George H. Simmons
atty Patented Oct. 27, 1953

2,656,945

UNITED STATES PATENT OFFICE 2,656,945

EGG TRAY AND COVER

Jesse R. Grant, Chicago, Ill.

Application January 6, 1949, Serial No. 69,590

8 Claims. (Cl. 217—26.5)

1

This invention relates to packing material for holding fragile articles, such as eggs, in a standard egg case during shipment and storage, and has for its principal object the provision of new and improved material of this kind.

It is a main object of the invention to provide packing material for eggs that can be molded from paper pulp.

Another object of the invention is to provide a molded pulp tray for supporting a layer of eggs in an egg case and having cups into which the eggs fit and pockets adjacent thereto for firmly holding the eggs in upright position.

Another object of the invention is to provide an improved molded pulp egg tray in which the cups and pockets in which the eggs are disposed are ventilated to permit circulation of air around that portion of the egg embraced by the pocket.

Another object of the invention is to provide a cover formed of molded pulp material and adapted to fit over and engage the top portion of eggs disposed in the tray.

Another object of the invention is to provide a cover having socket-like means into which the tray that supports the layer of eggs next above the cover registers and is secured for limited movement transversely with respect to the cover.

Another object of the invention is to provide a molded pulp cover having posts which are engaged by feet on an overlying tray simultaneously with the engagement of the cups of that tray with the cover, thereby to distribute the weight imposed upon the cover through the cover structure rather than through the eggs over which it is fitted.

Another object of the invention is to provide a packing means for supporting eggs in a standard egg case, which means permits an operator to readily grasp two or three eggs in each hand as is required in handling and transferring or grading of eggs, in accordance with established practices.

Further objects of the invention not specifically mentioned here will be apparent from the description and claims which follow, reference being had to the accompanying drawings in which a preferred embodiment of the invention is shown by way of oxemple and in which Fig. 1 is a plan view of the tray showing the improved egg-receiving cups and pockets;

Fig. 5 is a fragmentary plan view of the cover that is adapted to fit over the tray shown in Fig. 1;

Fig. 6 is a cross sectional view through the inverted cups of the cover, taken substantialy along the line 6—6 of Fig. 5, looking in the direction of the arrows;

Fig. 7 is a fragmentary cross sectional view taken through the feet on the tray and substantially along the line 7—7 of Fig. 5, looking in the direction of the arrows;

Fig. 8 is a fragmentary cross sectional view through the post on the cover, taken substantially along the line 8—8 of Fig. 5, looking in the direction of the arrows;

Fig. 11 is a fragmentary cross sectional view showing a modified form of inverted cup in the cover;

Fig. 12 is a view similar to Fig. 10 but showing the modified type of cover;

Fig. 13 is a view similar to Fig. 9 but showing the modified form of cover; and

Fig. 14 is a cross sectional view similar to Fig. 11 and showing a modified form of socket in the inverted cup.

Figure 1:
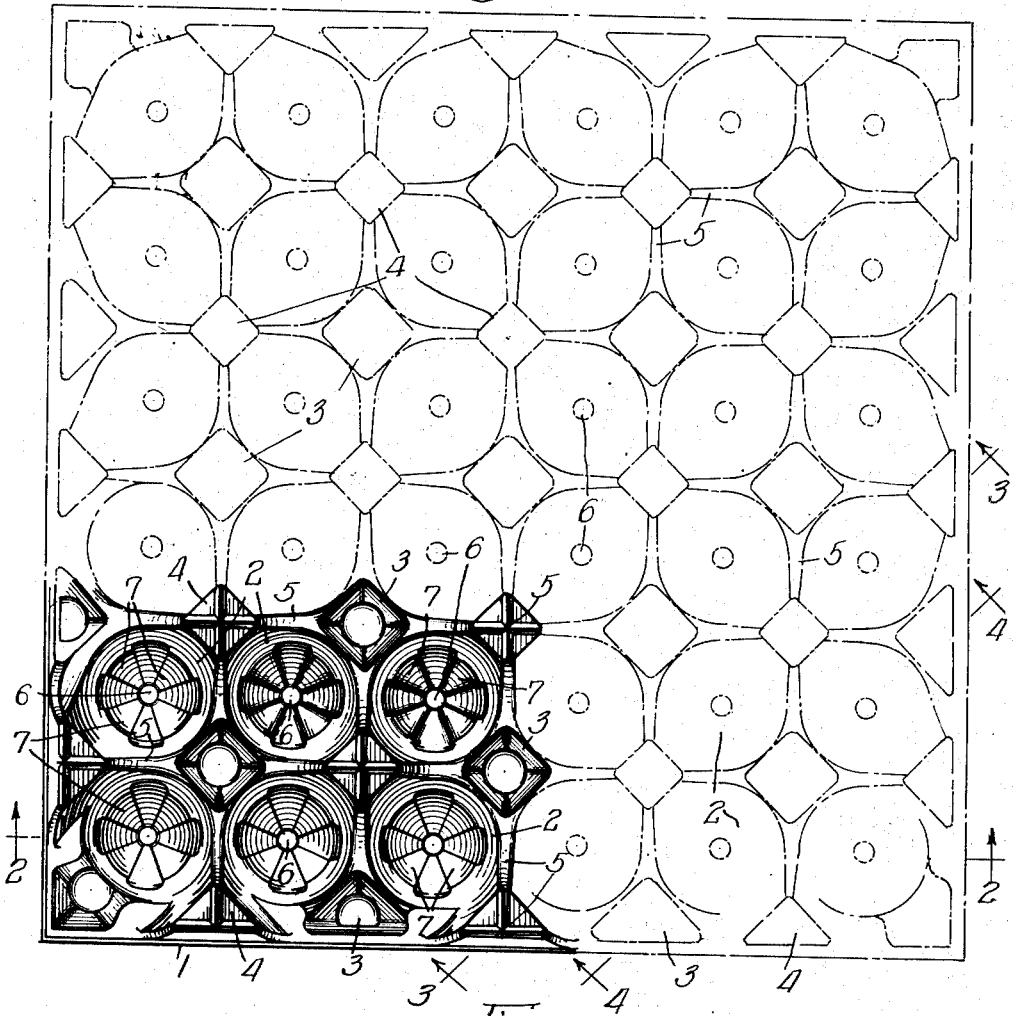
Figure 2:
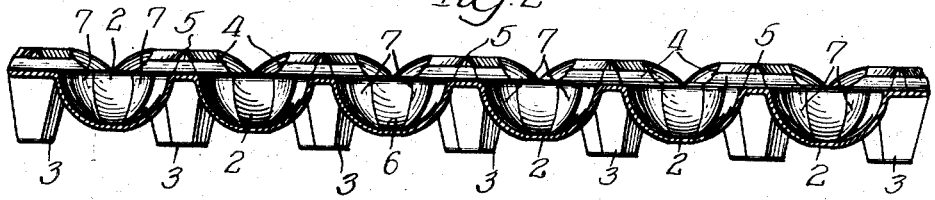
Fig. 2 is a cross sectional view taken substantially along the line 2—2 of Fig. 1, looking in the direction of the arrows.
Figure 3:
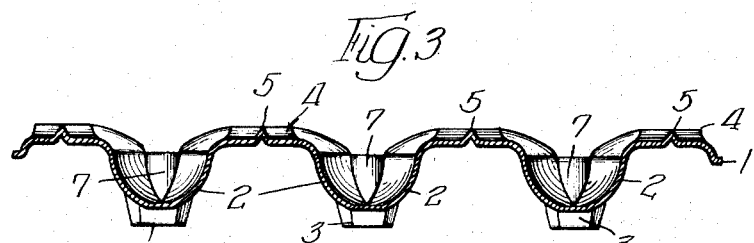
Fig. 3 is a fragmentary diagonal cross sectional view taken through the posts in the tray and substantially along the line 3—3 of Fig. 1, looking in the direction of the arrows.
Figure 4:
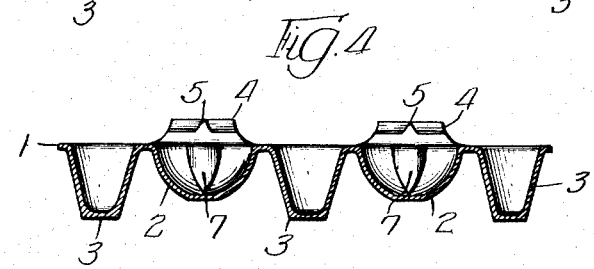
Fig. 4 is a fragmentary cross sectional view similar to Fig. 3 but taken through the feet on the tray and substantially on the line 4—4 of Fig. 1, looking in the direction of the arrows.
Figure 9:
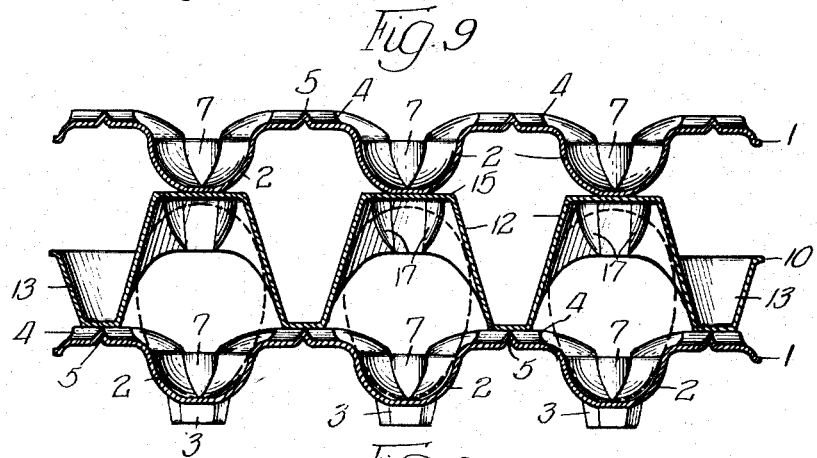
Fig. 9 is a cross sectional view similar to Figs. 2 and 6, showing the tray and cover fitted together and also showing a second tray registered with the cover.
Figure 10:
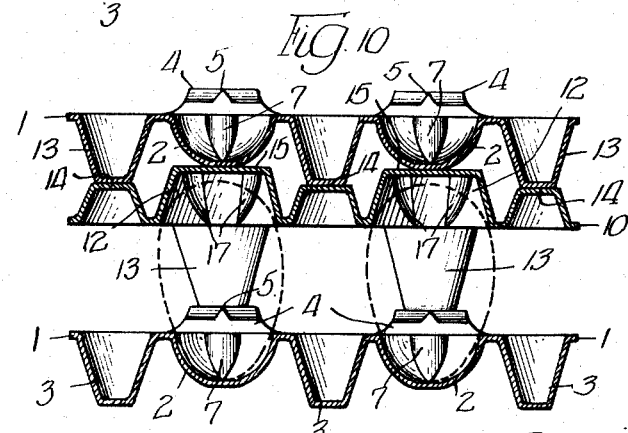
Fig. 10 is a cross sectional view similar to Figs. 4 and 8, showing the tray and cover registered together with a second tray registered with the cover.

Fragile articles, such as eggs, are commonly shipped in cases in which the eggs are disposed three dozen in a layer and five layers in each section of the case, so that each section contains fifteen dozen and the case contains thirty dozen eggs. It is also standard practice to provide generally rectangular flats commonly made of molded pulp material and containing cups or depressions into which the end of the egg projects. Resting upon this flat and disposed between the eggs in the cups is a so-called filler usually formed from paper stock and forming individual cells into which the eggs fit, which cells are closed by a second flat which also supports the layer of eggs next above.

In the prior art of which I am aware, numerous efforts have been made heretofore to form an egg encasing means entirely of molded pulp material and designed to replace the present flats and fillers in the shipment and storage of eggs in standard cases. Insofar as I am aware, none of these prior art devices have been entirely successful and none has gone into general use. Most frequently the fault present in these devices which prevented their use extensively has been the inability of the device to meet the requirements of established practices of the industry, which practices are generally referred to as commercial handling, as is more fully brought out in my prior Patent #2,346,161, issued April 11, 1944, and upon which patent the instant invention is an improvement. Under such commercial handling practices, an operator grading eggs received in carload lots will handle and grade in various grades as to size and quality an average of forty cases a day with present standard fillers and flats. Any molded pulp packing material which slows up this operation is looked upon with strong disfavor by the egg packers. The structure of my prior patent and the improvements of the present invention have been found to be satisfactory in this regard and operators using the devices of these inventions can handle and grade eggs just as fast as with fillers and flats.

The present invention seeks to provide an egg encasing means consisting of a tray upon which the eggs are supported and a cover that fits over the eggs and aids in supporting them in the pockets in the tray, the cover serving also to transmit the weight of the layers above to the tray through the cover rather than through the eggs.

The present invention seeks also to provide such an egg-packing means so designed as to permit operators to handle eggs in accordance with the customs and in the manners now long established in the industry, and at the same time to provide egg-packing material which can be molded at a cost low enough to compete with the flats and fillers now commonly employed in the industry.

To this end, the present invention provides a tray containing thirty-six pockets and egg cups which are arranged in six uniform rows, each containing six spaced-apart cups located so that the spacing of the pockets and cups is the same as the spacing of the rows, with the result that the tray is symmetrical in all four directions. Depending below the generally planar surface of the tray and below the egg cups which are depressed in this surface, are feet which, when the tray is placed in the bottom of an egg case, rest on the bottom of the case and space the lowermost portions of the cups from that bottom so as to cushion the eggs and space the eggs in the lowermost layer off of the bottom of the case. Also projecting above the generally planar surface of the tray are a plurality of posts which serve to support the cover on the tray independently of the eggs. The posts and feet are arranged alternately in rows which are disposed midway between adjacent rows of egg cups, and preferably the pattern of the feet and the posts, like the pattern of the egg cups, is symmetrical so that the tray may be placed in the case in any one of four positions indiscriminately.

The egg cups in the tray are shaped to engage and embrace the tip of the small end of an egg and the pockets to embrace the area of the egg adjacent such tip and from the tip to a point approximately one-fourth of the distance from end to end of the egg. This arrangement enables an operator who is filling the case by handling eggs, three in each hand, to drop the eggs into the cups, wherein the eggs will remain upright so as to permit registering the cover with the tray without aligning the eggs in upright position individually. Each egg pocket in the tray is preferably provided with grooves or depressions leading from the uppermost edge of the pocket down to the central point upon which the tip of the egg is rested so as to permit free circulation of air around that portion of the egg disposed in the pocket.

The cover contains a plurality of inverted pockets or cups arranged in uniformly spaced rows each containing six uniformly spaced inverted cups in symmetrical pattern, so that when the cover is placed in the case the inverted cups will be aligned directly above the cups in the tray.

The cover also contains feet depending below the cups and posts extending above the generally planar part of the cover, which posts terminate below the uppermost part of the inverted cups. The feet and posts are alternated in rows disposed midway between the adjacent rows of inverted cups and are preferably arranged in a symmetrical pattern so that the feet on the cover will register with the posts on the tray in the four positions in which the cover may be placed in the case.

Projecting into the inverted pockets or cups are one or more bosses adapted to engage in the region of the tip of the large end of an egg, thereby to center the egg in the inverted cup and tray pocket beneath it and to steady the egg therein. The edge section of the inverted cup or pocket depending below the bosses is larger than the uppermost edge of the pocket in the tray and is designed to engage the large end of an egg along a line located between the large end and center of the egg.

After the cover has been placed over the lower layer of eggs in the case, a second tray is registered with the cover, the lowermost portions of the egg cups in the tray resting upon the uppermost portions of the inverted cups in the cover. The feet on the tray project down between the inverted cups on the cover and engage the posts therein. The projection of the feet down between the inverted cups on the cover limits the movement of the second tray with respect to the cover, although the feet do not tightly engage the walls of the inverted cup and completely eliminate any movement between the cover and tray. Preferably, therefore, the bosses by which the large end of the eggs are centered in the inverted cups are arranged to engage the outer surfaces of the cups in the overlying tray to lock that tray with respect to the cover and independently of the posts on the tray. The size of the sockets is such that a slight amount of movement of the tray with respect to the cover is permitted thereby to better resist shocks placed upon the members. If desired, the posts on the tray may contain sockets into which the feet on the cover project to lock the cover against lateral movement with respect to the tray in the manner shown in my prior Patent #2,346,161. Preferably the top surfaces of the posts are ridged and when engaged by the flat bottom surfaces of the feet on the cover will indent those surfaces and thereby lock the cover with respect to the tray. The ridges in the posts on the tray tend to strengthen the tray thereby to make it more capable of withstanding the stresses placed upon it by the weight of the eggs and covers and other trays which it supports.

Referring now to the drawing in more detail. As will be seen in Figs. 1, 2, 3 and 4, the tray consists of a rectangular, generally planar member 1, containing a plurality of egg cups and pockets 2, which are uniformly spaced in uniform rows with six cups in each of the six rows. Also disposed in rows and located midway between the adjacent rows of cups and pockets are feet 3 which depend below the main planar surface of the tray and posts 4 which project thereabove. The posts and feet are alternated in the rows, as in my above mentioned patent. The feet 3 project below the lowermost portions of the cups 2 to space the cups in the lower layer in the egg case off of the bottom of the egg case, it being standard practice to space the tips of the cups in this lower layer one-fourth of an inch above the bottom of the case thereby to cushion the eggs in the case. The height of the posts 4 above the main planar surface of the tray is not of the essence of the present invention. In my above mentioned prior patent, the posts were terminated in a plane disposed approximately one-third of the distance from the tip to the large end of the egg. So long as the posts terminate below the middle of an egg in the cups, the requirements of the present invention will be fulfilled.

Extending between each post 4 and the adjacent feet 3 are ribs 5 which project upwardly out of the tray 1 and are disposed between adjacent rows of cups and adjacent cups in the rows. These ribs serve to stiffen the tray and also define a part of the upper egg engaging surfaces of the pockets. Preferably the ribs blend into the posts, the feet and the pockets so that there are no sharp edges that can come into contact with the eggs and so that the draw angles for molding can be maintained.

As will be seen in Figs. 1, 3, 9, and 10, ribs 5 extend across the tops of posts 4 and cross at the centers of the posts. In section, the portions of the ribs on the tops of the posts are inverted V's and are made as sharp as possible consistent with good molding practices. This construction stiffens the posts and aids in maintaining alignment, as will presently appear.

As will be seen in Fig. 1, each of the egg cups 2 contains a central flat, preferably generally circular portion 6, from which diverge four egg-engaging ribs 7, which form the pocket. The upper surfaces of these ribs are shaped so as to embrace an egg adjacent the tip of its smaller end. Thus with the tip of the egg resting upon the central egg cup 6, and the surfaces of the bosses 7 engaging the adjacent portions of the egg, the egg will be supported in upright position in the cup. Adjacent the bosses and disposed therebetween are grooves or depressions 8 which also converge from the central section 6 of the cup and form channels through which air may circulate to ventilate the tip section of the egg disposed in the cup. It is important that the cup and pocket so formed be of such size as to fairly accurately engage the tip sections of medium, large and extra large eggs, which three sizes of eggs weigh from 43 to 52 pounds net weight per case of 30 dozen eggs and constitute a vast majority and approximately ninety per cent of the eggs that are shipped.

As will be seen in Figs. 5, 6, 7 and 8, the cover consists of a generally planar member 10 in which inverted cups 12 are arranged in uniform rows with six cups in each row. Depending below the generally planar surface of the cover are feet 13 by which the cover is supported upon the tray. Projecting above the generally planar surface of the cover are posts 14 which terminate below the uppermost surfaces 15 of the inverted cups 12. The lowermost edges 16 are preferably located substantially upon a circle which is of such diameter as to enable the edge of the cup to engage the egg on a line spaced from the tip of the large end of the egg a distance approximately equal to one-fourth of the height of the egg. With shorter eggs, the line of engagement will be somewhat higher on the egg.

Projecting into the inverted cup in the cover at points at the lower edge of the cup are bosses 17 which, in the example shown in Figs. 5 to 8, are four in number and located ninety degrees apart. The innermost edges of these bosses form a generally conical cavity and the edges are positioned so as to engage the tip section of the large end of an egg, thereby to center the egg in the inverted cup and to aid in keeping the egg in upright position in the cup in the tray.

When the cover is registered with the tray and fitted over the eggs carried thereby, feet 13 on the cover register with posts 4 on the tray. The bottoms of the feet 13 are flat and the ribs 5 on the top surfaces of the posts will deform this flat surface as weight is applied to the cover. The weight thus transmitted to the tray acts in compression on the posts rather than in tension as in the case of sockets such as are shown in my above mentioned patent. Since these forces are in compression, there is less likelihood of damage to the tray in cases of severe shock, as will presently appear.

In the embodiment of the invention shown in Fig. 11, the boss 18 is of circular configuration and is depressed into the uppermost end of the cup 12. The boss 18, like the bosses 17, defines a line of engagement near the tip of the large end of the egg to center the egg and hold it firmly in the cups.

The boss 18 being depressed into the upper surface of the inverted cup defines the lower portion of a recess or socket 19 in the cover. As will be seen in Figs. 12 and 13, when the tray immediately above the cover is put in place, the egg cups 20 therein nest in the socket 19 and engage the rim 21 thereof to position the tray with respect to the cover. The feet 22 on this tray rest upon the post 4 on the cover, thereby to aid in supporting the tray on the cover. The engagement of the egg cups with the sockets 19 lock the tray with respect to the cover so that the movement of the one relative to the other is limited to the amount of play between the cups and the rim 21 of the socket.

In the modification shown in Fig. 14 an opening 24 is formed in the top surface of the inverted cup 25 in lieu of the socket 19. When a tray cup such as 20, Figure 13, is registered with the inverted cup, the tip portion of the cup projects into this opening and the walls of the cup engage the edge of the inverted cup around the opening. As weight is placed on the tray cup, the wall compresses somewhat to resist the weight and to lock the tray cup with respect to the inverted cup. This arrangement adds length to the egg space equal to the thickness of material in the inverted cup and retains one thickness of material between the layers of eggs as in present day practice.

When the trays and covers of the instant invention are stacked five deep in the section or compartment of a standard egg case, with each tray and cover embracing a layer of eggs, the cover on the uppermost layer will project slightly above the top edge of the case. When the cover of the case is fastened down onto the case, the covers and trays will be compressed sligtly, forming a tight pack which securely holds the eggs cushioned in all directions. This compression of the packing material is accomplished through give in the material and does not impose any pressure endwise on the eggs, so that the case may be shipped and stored without danger of endwise crushing of the eggs.

The stresses placed upon the cover of the uppermost layer in the case as the cover of the case is secured in place, are transmitted to the uppermost tray through the feet on the cover and the posts on the tray. These stresses and the weight of the eggs in the uppermost layer are transmitted to the cover of the next lower layer through the bottoms of the egg cups in the tray to the tops of the inverted cups in the cover and also through the feet on the tray and posts on the cover. In a similar manner the stresses and weight of each layer is transmitted to the next lower layer in the case.

Thus it will be seen that the feet on the bottom tray support the entire weight of all the eggs and transmit all stress set up in the pack on and to the bottom of the case. The posts on the lowermost cover support the weight of all the eggs except those in the lowermost layer and all of the stresses of the upper layers. These forces acting on the bottoms of the feet and on the ribs 5 on the tray posts, may cause the ribs to deform the bottoms of the feet. Such action will lock the feet on the posts and thereby prevent lateral movements of the cover with respect to the tray.

Although the deforming of the feet by the ribs will increase as the bottom of the case is approached and will be greatest in the bottom layer, the stress imposed by securing the cover on the case will produce some deforming and it has been found that there is no lateral movement of the covers with respect to the trays in the case. All stresses placed upon the packing material are in compression thereon and the likelihood of damage thereto is minimized even in the event of severe shock. The eggs are securely held and properly centered in the cups and pockets and damage thereto is likewise minimized.

Throughout the foregoing description, various surfaces have been referred to as generally circular, or as spherical sections and the like. Oftentimes molders prefer to form such surfaces as polygonal surfaces approaching the circle but nevertheless having quite definitely defined flat portions. The term "generally circular" as used herein, is intended to include such polygonal shapes.

The egg-packing material of the instant invention which broadly is an improvement on my prior above mentioned patent retains all of the desirable features of that patent and improves upon these features principally by re-shaping of the egg cups to provide ventilation where ventilation is advantageous, and to provide for better support and securer fastening of the eggs in the layers. The arrangements herein shown are all capable of being molded from pulp material by established molding practices at a cost low enough to compete with fillers and flats as now used. The spacing of the cups and establishment of the parting line between the tray and cover below the center of the eggs in the cup permits operators to handle the eggs two or three at a time in accordance with established practices. When an operator is transferring eggs into a case equipped with the packing material of the instant invention, the cups in the tray will receive the eggs dropped therein and hold the eggs upright within limits small enough to permit the cover to be registered and the eggs centered by the egg-engaging surfaces of the cover. This is an important improvement over prior art devices of which I am aware, wherein the cups in the tray were too large to properly engage and hold the tip of the small end of the egg.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described the preferred embodiment of my invention, which I consider new and desire to have protected by Letters Patent is pointed out in the appended claims.

What is claimed is:

1. Means for encasing eggs in a standard egg case comprising: a tray formed of molded pulp material; egg cups formed in said tray and arranged in six uniformly spaced rows with six uniformly spaced apart cups in each row; each of said cups having a generally circular bottom portion adapted to receive the tip of the small end of an egg, a plurality of bosses rising from said bottom portion and shaped to form a pocket that snugly embraces the egg adjacent to said tip to support the egg upright in the cup, said bosses being uniformly spaced apart and connected together by bands of generally spherical section spaced outwardly from the egg embracing faces of the bosses, feet depending below said cups, posts extending above said pockets, said feet and posts being alternated in rows disposed midway between adjacent rows of cups, ribs extending between said feet and posts and across the tops of the posts and projecting above the tray and posts to stiffen the tray; and means supported on said posts for covering eggs supported in said pockets.

2. Egg encasing means as claimed in claim 1, in which the means for covering the eggs comprises a molded pulp cover having inverted cups each of which has a lower edge adapted to engage an egg, boss means projecting into each inverted cup adapted to bear against the large end of an egg to hold it in the pocket in the tray; and feet depending below the inverted cups and registered with the posts on the tray to support the cover on the tray.

3. Egg encasing means as claimed in claim 1, in which the means for covering eggs supported in the pockets in the tray includes posts for engaging the feet of a second tray to support that tray on said means.

4. Means for encasing eggs in a standard egg case, comprising: a tray formed of molded material, six uniformly spaced apart egg cups in each of six uniformly spaced apart rows in said tray, each of said cups being shaped to receive the tip end of an egg and to grip the egg along bands extending from the tip upwardly far enough to securely support the egg uprightly on the tray; feet on said tray positioned between adjacent rows of cups and depending therebelow; a cover formed of molded material; six uniformly spaced apart inverted egg cups in each of six uniformly spaced apart rows in said cover; means for supporting said cover on said tray with the inverted cups in spaced apart relation to the cups in the tray, each of said inverted cups being shaped to fit over the large end of an egg in the tray cup and to grip the egg in the region between the middle and large end of the egg; recesses in the top of each of said inverted cups forming boss means which engage the egg in the region immediately adjacent to the large end thereof; posts on said cover projecting upwardly between adjacent rows of said cups and terminating in flat portions disposed below a plane through the tops of said inverted cups, said posts being adapted to receive the feet of a second tray to support the tray above the cover, with the bottoms of the cups in the tray projecting into said recesses to aid in supporting the tray on and to lock said tray against movement laterally of said cover.

5. Means for encasing eggs in a standard egg case comprising: a tray formed of molded pulp material; egg cups formed in said tray and arranged in six uniformly spaced rows with six uniformly spaced apart cups in each row; a flat bottom in each cup adapted to receive the tip of the small end of an egg; a plurality of uniformly spaced apart bosses rising from said bottom and shaped to snugly grip an egg adjacent its tip to support it uprightly in the cup; feet depending below said cups; posts extending above said pockets, said feet and posts being alternated in rows disposed midway between adjacent rows of cups; upwardly projecting ribs between said feet and posts to stiffen the tray; a cover formed of molded pulp material, inverted cups in said cover arranged in six uniformly spaced rows with six uniformly spaced apart cups in each row; a generally circular bottom edge on each inverted cup adapted to grip the large end of an egg above the center thereof; boss means projecting into each inverted cup adapted to bear against the end of an egg adjacent the uppermost point thereon to hold the egg in the cup in the tray; and feet depending below said bottom edge and registered with the posts on the tray for holding the cover on the tray with the inverted cups alined axially with the cups in the tray.

6. Means for encasing eggs in a standard egg case comprising: a tray formed of molded pulp material; egg cups formed in said tray and arranged in six uniformly spaced rows with six uniformly spaced apart cups in each row; a flat bottom in each cup adapted to receive the tip of the small end of an egg; a plurality of uniformly spaced apart bosses rising from said bottom and shaped to snugly grip an egg adjacent its tip to support it uprightly in the cup; feet depending below said cups; posts extending above said cups and terminating in a plane disposed below the centers of eggs in the cups, said feet and posts being alternated in rows disposed midway between adjacent rows of cups; upwardly projecting ribs extending between said feet and posts to stiffen the tray; a cover formed of molded pulp material, inverted cups in said cover arranged in six uniformly spaced rows with six uniformly spaced apart cups in each row; a generally circular bottom on each inverted cup adapted to grip the large end of an egg above the center thereof; boss means projecting into each inverted cup adapted to bear against the end of an egg adjacent the uppermost point thereon to hold the egg in the cup in the tray; and feet depending below said bottom edge and registered with the posts on the tray for holding the cover on the tray with the inverted cup alined axially with the cups in the tray.

7. Means for supporting eggs in upright position in a standard egg case comprising: a tray formed of molded pulp material; feet depending below said tray, posts extending above said tray, said feet and posts being disposed in rows and being alternated in said rows; upstanding ribs extendng between said feet and posts and blending thereinto to stiffen the tray; a plurality of egg cups in said tray disposed in rows between said rows of feet and posts and ribs, each of said cups comprising a planar bottom portion disposed in a plane above the bottoms of said feet and adapted to receive and support the tip of the small end of an egg; a plurality of bosses rising from the outer edges of said planar portion and blending into said posts and ribs and adapted to grip an egg in an interrupted band adjacent the tip to hold the egg in upright position on said planar portion; and wall portions of said cups disposed between said bosses and blending into said feet and posts and ribs, and spaced from an egg gripped by the bosses to provide ventilation to the tip of the egg.

8. Means for encasing eggs in a standard egg case comprising: a cover formed of molded pulp material; a plurality of inverted egg cups formed in said cover and arranged in six uniformly spaced rows with six uniformly spaced apart cups in each row, each of said cups being generally shaped as a section of a sphere adapted to fit over the tip portion of the large end of an egg and each cup having its lower edge defining opposed circular portions adapted to grip the egg, said cups having intervening opposed portions defining feet depending below the bottom edges of the cups and terminating in a plane below the middle of eggs in the cups; posts projecting upwardly from said cover and terminating in a plane below the tops of said cups, said posts being located immediately adjacent said opposed circular portions of the cups, and said feet and posts being alternated in rows disposed midway between adjacent rows of cups; and boss means projecting into said cups above said lower edges thereof and shaped to engage the large end of an egg immediately adjacent the tip thereof and above said lower edge.

JESSE R. GRANT.

References Cited in the file of this patent

UNITED STATES PATENTS

| Number | Name | Date |
|---|---|---|
| 1,850,584 | Gray | Mar. 22, 1932 |
| 1,857,984 | Swift, Jr. | May 10, 1932 |
| 1,929,944 | Chaplin | Oct. 10, 1933 |
| 1,956,955 | Kronenberger | May 1, 1934 |
| 2,236,675 | De Reamer | Apr. 1, 1941 |
| 2,345,274 | Manson | Mar. 28, 1944 |
| 2,378,627 | Grant | June 19, 1945 |
| 2,505,886 | De Reamer | May 2, 1950 |